United States Patent [19]

Kraft, IV et al.

[11] Patent Number: 5,867,160

[45] Date of Patent: Feb. 2, 1999

[54] SYSTEM AND METHOD FOR TASK PRIORITIZATION IN COMPUTERIZED GRAPHIC INTERFACE ENVIRONMENTS

[75] Inventors: George Kraft, IV, Austin; John Anthony Moore, Cedar Park, both of Tex.

[73] Assignee: International Business Machines Corporation, Armonk, N.Y.

[21] Appl. No.: 741,889

[22] Filed: Oct. 31, 1996

[51] Int. Cl.⁶ ........................................ G06F 3/00
[52] U.S. Cl. ............................... 345/344; 395/673
[58] Field of Search ..................... 345/332, 335, 345/339, 340, 343, 344, 345, 346, 349; 395/670, 673, 674, 675, 677, 200.3, 200.31; 364/468.06, 468.07

[56] References Cited

U.S. PATENT DOCUMENTS

| | | | |
|---|---|---|---|
| 5,185,857 | 2/1993 | Rozmanith et al. | 707/507 |
| 5,386,564 | 1/1995 | Shearer et al. | 707/101 |
| 5,390,325 | 2/1995 | Miller | 395/183.14 |
| 5,412,756 | 5/1995 | Bauman et al. | 706/45 |
| 5,428,789 | 6/1995 | Waldron, III | 395/673 |
| 5,438,659 | 8/1995 | Notess et al. | 345/355 |
| 5,471,577 | 11/1995 | Lightbody et al. | 345/340 |
| 5,490,249 | 2/1996 | Miller | 395/183.14 |
| 5,542,088 | 7/1996 | Jennings, Jr. et al. | 395/673 |
| 5,551,041 | 8/1996 | Beethe | 395/733 |

OTHER PUBLICATIONS

Petzold, C., "Why you need to multitask in the OS/2 presentation Manager," PC MAgazine, V9, N9, 1990, p. 293–(4).

Koshizuka, N., "Highly responsive implementation of the BTRON2 window system," IEEE 10th TRON Int. Sysmposium, Dec. 1993, pp. 82–93.

Ghosh, S., "Optimization of a low–cost truly preemtive multitasking PC diagnostic workstation," J. of Digital Imaging, V10, N3, Aug. 1997, pp. 171–174.

"Windows NT and Unix—What's the difference MD+DN?" Wall Street & Technology, Dec. 1995, p. 46.

*Primary Examiner*—A. Katbab
*Attorney, Agent, or Firm*—Robert M. Carwell

[57] ABSTRACT

A system and method are provided for automatically adjusting priority assigned to execution of applications, tasks, or workspaces to thereby improve performance relative to other such applications, tasks or workspaces in a computerized multitasking graphical user interface environment. A display of a plurality of visual indicators is provided, each of which corresponds to a differing task. By selection of one of the indicators, the priority given to execution of the task is altered as the task is thereby moved into a focused state as a result of such selection. A window manager interposed between a server and application registers in the server the adjusted state of a particular application as being either set in focus or cleared. An application may detect from the server a window-id corresponding to the application for which an adjustment in priority is desired. A mapper function, lookup table, or the like for mapping window-id to a corresponding process-id is obviated as a result of employing messaging/signalling. The amount of CPU resource then directed to the particular application as a result of the priority alteration is thereby in turn altered. In this manner, a focused application is dynamically provided with more CPU resource relative to remaining tasks, applications, or suites thereof associated with a workspace executing in the multitasking environment.

18 Claims, 4 Drawing Sheets

SYSTEM AND METHOD FOR TASK PRIORITIZATION IN COMPUTERIZED GRAPHIC INTERFACE ENVIRONMENTS

Cross Reference to Related Applications

The present invention appears to claim subject matter disclosed in co-pending application, Ser. No. 08/741,888 IBM Docket AT9-96-249, filed on Oct. 31, 1996.

TECHNICAL FIELD

This invention relates to computer systems supporting graphical user interface environments and, more particularly, relates to systems and methods for more efficient handling of multiple tasks graphically in multitasking environments.

BACKGROUND OF THE INVENTION

With the advent of increased processing power, improved video support, and multitasking operating systems in modern computer systems, it has become commonplace for computer applications to execute multiple tasks in graphical user interface (GUI) environments. Such a GUI, as distinct from a command-line interface, typically employs one or more graphical windows such as windows 2–4 depicted in FIG. 1 which provide the workspace for the end user. End users desirably interact with such workspaces by means of pointing devices, keyboards, and the like. More particularly, the user may interface with the computer system by interacting with various graphical images such as icons, cursors, etc. through keyboard entry and pointing device movements, etc. well known in the art.

In the course of development of such GUI environments and as a result of the improvements noted above, it soon became apparent that it would be desirable for several GUI applications represented by the windows of FIG. 1 to be capable of running simultaneously in a user's GUI desktop. A representative example of such an application and desktop, respectively, would be the "Motif" GUI application running in a GUI desktop known as "CDE", or the common desktop environment. Motif is a software package developed through the Open Systems Foundation (OSF), and the Common Desktop Environment (CDE) is a desktop environment distributed by the IBM Corporation, among others.

As is typical in such environments, the user is most interested at a given time only in a single active task or application (although other such tasks or applications might nevertheless also be executing concurrently). In accordance with conventional parlance, this notion of one of many tasks being active and of most interest is referred to as the task or associated window being in "focus". Naturally, because the user is most interested in this particular task, he or she desires that the computer systems provide the best response for this task as opposed to other tasks which may be also executing concurrently in a multitasking operating system.

Unfortunately, however, it is the nature of such multitasking systems that all windowed tasks executing therein (a representative example of which is the Unix operating system distributed by the Novell Corporation) operate with equal priority or access to the cpu(s) in he computer system.

Put differently, in accordance with prior art technique, all applications or tasks essentially were executed at the same CPU priority. One serious drawback with this was that if a highly CPU-intensive application was then iconified, e.g., defocused and pushed down in the stack, it nevertheless continued to consume its substantial share of the CPU processing ability, thereby essentially stealing processing time from a different currently focused window for which the user was desiring the most response.

As multitasking operating systems developed, the art progressed even further to the point that multiple workspaces, e.g., virtual screens, depicted in FIG. 2 are now provided, each such desktop space 6–9 or virtual screen being capable of executing an associated different entire suite of running GUI applications. In like manner to the previously described situation with respect to an individual task or application associated with a window, it became commonplace for present computer systems to cause each of such multiple workspaces (in addition to the individual windowed applications or tasks of FIG. 1) to execute with equal priority notwithstanding that a user was most interested in and desired the best response from a particular one of the workspaces and the application(s) or task(s) associated therewith. However, as in the case of individual applications or tasks being relegated to having the same priority regardless of which was "focused" at the time, this same drawback obtained in the case such multiple workspaces. In other words, notwithstanding that a particular such workspace such as workspace 6 of FIG. 2 was of primary interest at a given time to a user and thereby focused, the art nevertheless gave equal priority to the remaining workspaces 7–9, thereby consuming CPU resource that could better be directed to the workspace of current interest, e.g., workspace 6.

For all the foregoing reasons, a solution was highly desired and sought after which could remedy the foregoing situation and address the problem of non-focused applications, tasks, and workspaces consuming CPU resource at the expense of a particular application, task, or workspace which the user was interacting with and thereby in need of better performance for.

SUMMARY OF THE INVENTION

A system and method are provided for automatically adjusting priority assigned to execution of applications, tasks, or workspaces to thereby improve performance relative to other such applications, tasks or workspaces in a computerized multitasking graphical user interface environment. A display of a plurality of visual indicators is provided, each of which corresponds to a differing task. By selection of one of the indicators, the priority given to execution of the task is altered as the task is thereby moved into a focused state as a result of such selection. A window manager interposed between a server and application registers in the server the adjusted state of a particular application as being either set in focus or cleared. An application, through its corresponding window-id, may detect from the server that an adjustment in priority is desired. The information from the window manager that is passed through the display server is utilized by the application to adjust its own priority relative to the remaining applications in the operating system's process table. A mapper function, lookup table, or the like for mapping window-id to a corresponding process-id is obviated as a result of employing messaging/signalling. The amount of CPU resource then directed to the particular application as a result of the priority alteration is thereby in turn altered. In this manner, a focused application is dynamically provided with more CPU resource relative to remaining tasks, applications, or suites thereof associated with a workspace executing in the multitasking environment.

DETAILED DESCRIPTION OF THE PREFERRED EMBODIMENT

Figure 3:
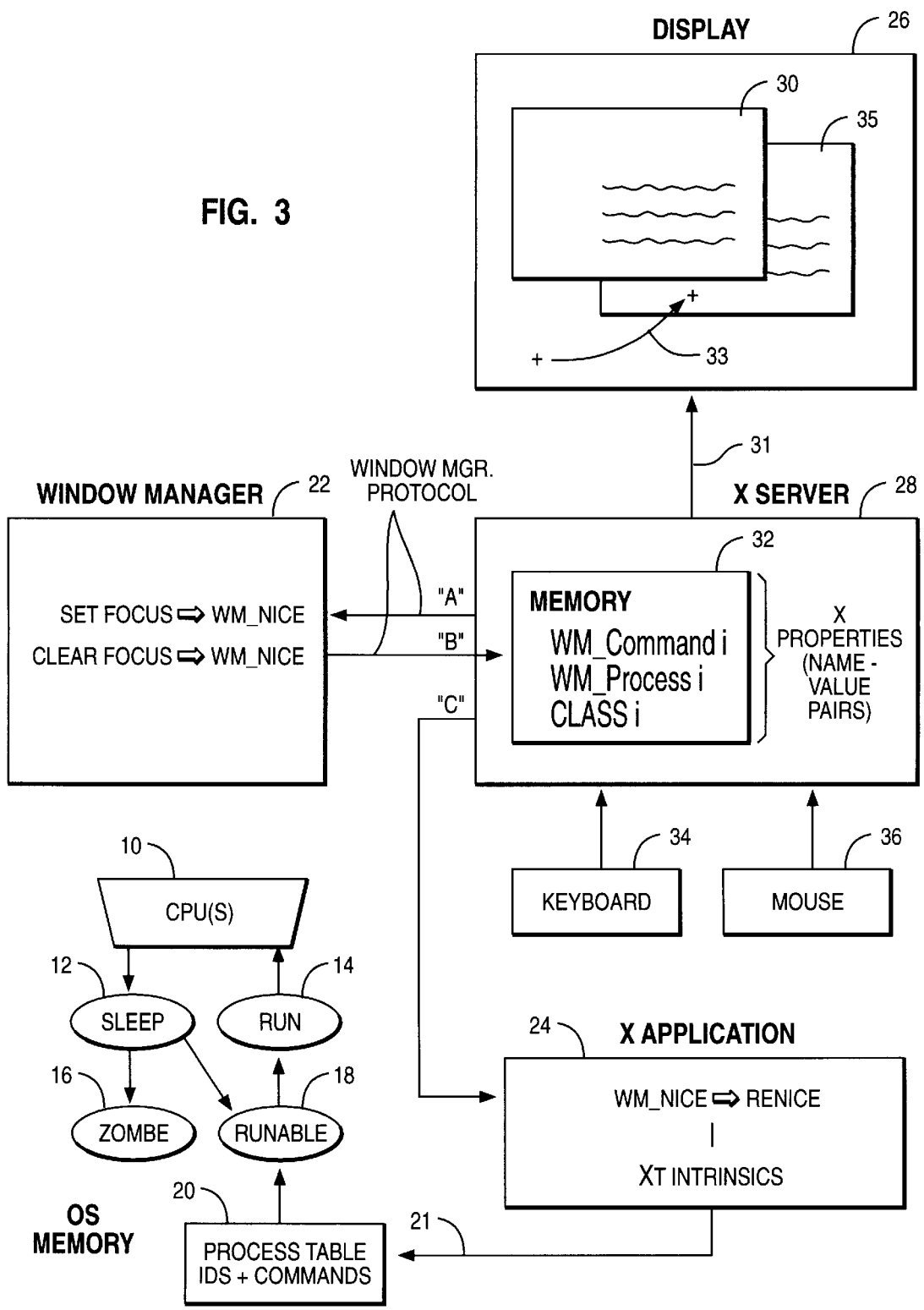
FIG. 3 is a functional block diagram of one embodiment of the invention illustrating a multitasking computer system adapted in accordance with the invention for prioritizing GUI applications executing thereupon.

Referring first to FIG. 3, depicted therein is a functional block diagram of an implementation of the invention. Although the embodiment depicted is for a computer system executing the Unix operating system and a window manager 22 to be hereinafter described, the invention is not intended to be so limited and admits to implementations with other operating systems and computer systems not employing the particular window manager as described.

Figure 1:
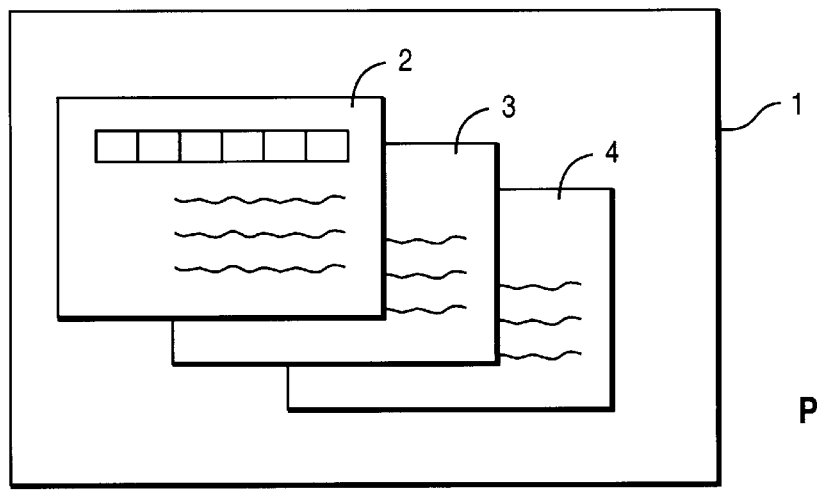
FIG. 1 is a representation of a typical graphical user interface employing multiple hierarchical windows having tasks associated therewith.
Figure 2:
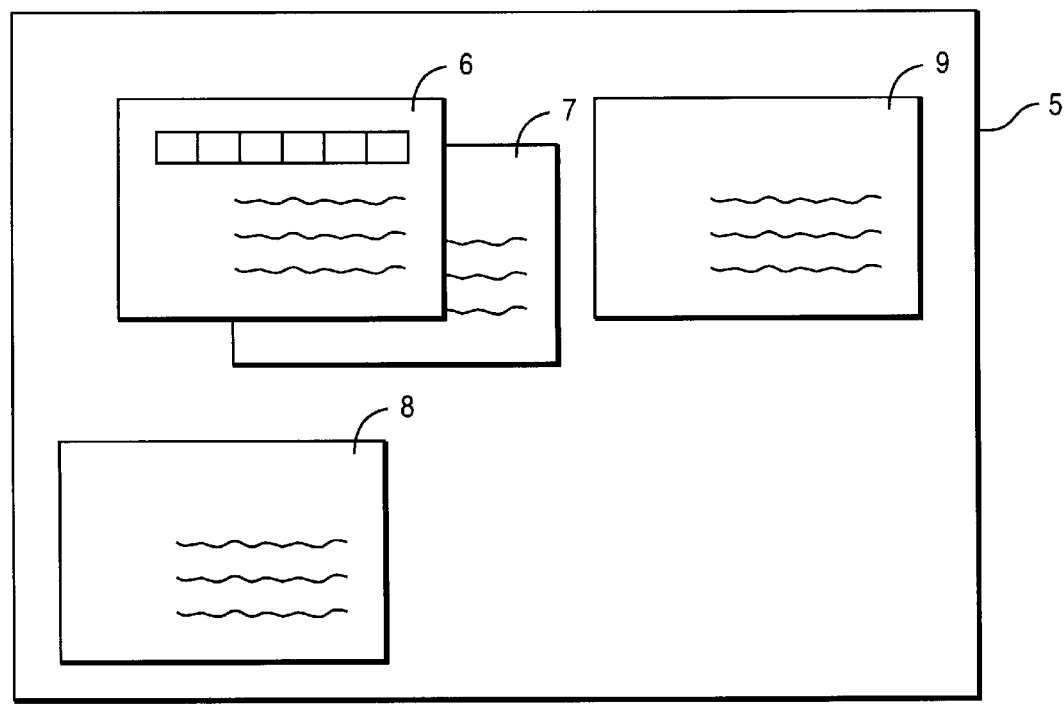
FIG. 2 is another illustration of a typical graphical user interface depicting multiple hierarchical workspaces or virtual screens, each having associated therewith a suite of running GUI applications.

First, an appropriate video display 26 is provided which may take any convenient conventional form such as the familiar CRT or dot matrix displays. Such a display is capable of representing on the screen a plurality of windows 30, 35 or workspaces 6–9 of FIGS. 1–2, each having associated therewith at least one task to be performed by the system. The visual display appearing on the display 26 is controlled by signals 31 from an X server 28. In keeping with conventional practice, one function of the X server 28 is to retain in logical memory 32 a plurality of name-value pairs which, as will be seen, will facilitate interclient communication. Each name-value pair will have a unique name associated with it and a parameter value whereby a process, by knowing the name, may essentially query the X server to obtain the corresponding value associated with the name. The combination of these name value pairs or X properties ill be stored in the logical memory 32, whereby they may be readily retrieved and stored, utilizing a window manager protocol which will facilitate interclient communication between the X server 28 and the aforementioned window manager 22, and X applications, 24.

One such X property stored in server 32 in accordance with this window manager protocol as depicted in FIG. 3 is an X property atom referred to herein as "WM_NICE", which essentially is a triggering mechanism for the process described herein as will hereinafter be further detailed. As is well known in the art, "NICE" is a familiar term in Unix parlance, representing operating system functionality which facilitates changing the scheduling primitives of the central processor(s) or CPU(s) 10. It is conventional to refer to a NICE increase or NICE decrease which will correspond to enabling for a given process more or less CPU access by the process, respectively. For sake of completeness, it will be noted that window manager protocols (WM_PROTOCOLS) are essentially messages sent to an application from the window manager that indicate conditions requiring immediate action. There are currently three protocols defined in the Inter-Client Communication Conventions Manual (ICCCM).

The Manual defines a starting point for what information may be sent back and forth. A summary of Section 11.1.8 may be helpful in understanding the invention. At such section it is indicated that the application and the Motif Window Manager (MWM) can communicate back and forth through properties stored on he server. The properties are associated with the top-level window of an application so, unlike selections, similar communications can be going on at the same time between different clients and the window manager without interference. Shell widgets handle the required communication with the window manager, as further set out in the manual. Further detail regarding the window manager, WM_PROTOCOLS, and other background information regarding the implementation thereof may be found in the X Protocol Reference Manual. Details regarding interacting with the Motif Window Manager, in particular, may be found at Section 1.

In addition to effecting displays on the display 26, the X server software additionally performs the function of managing end user input from a keyboard 34, mouse 36, and like devices and controlling the associated X protocols for the devices.

Continuing with FIG. 3, the window manager function 22 is provided to serve essentially as a go-between between various X applications 24 and the X server 28 for certain window manager events. Although in the implementation herein described a hereinbefore noted Motif window manager is utilized, the invention admits to application in systems employing other window managers, of which many are available, wherein such window manager will provide the functionality of setting and clearing of applications' and windows' focus. When a given application such as X application 24 goes into and out of "focus", this may be visually represented by an associated window such as window 30 in display 26, by means of the border of the window changing color, and the window associated with the particular application coming to the top or being placed lower in the stacking order, respectively. In addition to this window manager 22 setting or clearing focus so as to cause the GUI window of the related application to come to the top of or being placed within the display stack 26, it will be recalled that an additional feature of the invention is to provide for additional CPU 10 utilization for the task, application, or suite of applications associated with that "focused" window.

Still continuing with FIG. 3, a process table 20 is conventionally provided which contains, for the various processes operating in the system, their priority relative to the CPU(s) 10. The WM_NICE increase or decrease message, a window manager protocol message, from the window manager 22 to the X server 28 (in response to a corresponding application and, a window manager protocol message, its window going into or out of focus) will be trapped back at the application 24 as shown by arrow C through the X interclient communication, indicating that for the particular application 24 a change of a RENICE value is to be effected. Accordingly, the X application 24 will make a call to the Unix operating system which will effect a change in its process table 20 and a corresponding change in its priority to the CPU(s) 10 so that the application may receive a higher or lower priority, depending on whether the corresponding process has been placed in focus or out of focus, respectively.

Explanation of a few Unix generalities will be helpful in gaining an understanding of the invention. When this priority change is reflected in the runnable queue 18, it will eventually be transferred to the CPU 10 run queue 14 and the task will execute on the CPU at the designated increased or decreased rate. When the process is through running on the CPU for its corresponding time slice, it will enter the sleep state 12. The task will remain in the sleep state while it is determined if there is any pending I/O, e.g., devices continuing to be dependent upon further execution, in which case the process will return to the runnable state 18 and eventually will be run again, 14, by the CPU 10.

For sake of completeness, it is also conventional to find a "zombie" state 16 in such Unix systems. This is a conventional Unix term referring to the fact that when a given task or application is executing and depends upon an I/O device which is killed, the application essentially becomes held in the process table 20 and thus associated memory will not be freed up. In other words, this is simply a term referring to the fact that in some instances a resource in a Unix environment may remain until the machine is rebooted, otherwise known as a "defunctional" process. It will be noted that in a multitasking environment of the invention, of course, other tasks or applications will also be present in the runnable queue 18 although, at a given time, only one job is typically running on the CPU 10 at a time, unless we are using a multi-processor system. The invention nevertheless provides a mechanism whereby the runnable priorities essentially may be changed dynamically for all the corresponding applications or tasks which are windowed in the display 26. The highest priority as reflected in the runnable queue 18 is thus assigned to a task which is "focused" whereas a lesser priority is assigned to unfocused tasks.

In summary, in accordance with the invention, the following general steps will be effected. It will first be assumed that a user input is typically provided by means of the keyboard 34 or mouse 36, reflecting that a particular window and its associated task is of more interest or priority to the user. This is shown graphically in FIG. 3 by the arrow 33, indicating that a cursor of the mouse pointing device 36 for example, has been moved by a user into the window 35. This indicates that the end user desires to cause the window 35 to be "focused" into prominence both visually in the display 26 and in terms of the processing power allocated to tasks associated with this window 35 by the CPU 10.

The foregoing may be more clearly seen with reference to FIG. 3 and the flowpaths designated ABC. At "A" it will noted that the server 28 has notified the window manager 22 about focus information. At "B", the arrow signifies that the window manager 22 has transmitted a WM_NICE message/signal to the X Server 28. Flowpath "C" indicates that the X application 24 has received a WM_NICE message via the server 28.

The foregoing steps may be seen graphically illustrated in more detail with reference to FIG. 4. A more detailed discussion follows hereinafter of FIG. 4, which illustrates usage of the WM_NICE signals/message which avoids the undesirable aspects of a lookup table.

First it is assumed that the user has moved the pointing device, 51, whereby a window is either selected, 52, or deselected, 57. Assuming a window was selected, the window manager will then set focus and messages to the application via the WM_NICE command, 53. The window manager thereafter will change decorations and raise the window to the foreground, 54. An application then receives the WM_NICE command and requests the operating system to increase priority, 54. The operating system then executes the application at a higher priority, 56.

If the window was deselected, 57, the window manager, in the alternative, will unset focus and messages to the application via the WM_NICE command, 58. The window manager then will change the decorations and lower the window in the window stack, 59. Next, an application will receive the WM_NICE command and request the operating system to decrease priority, 60. Finally, the operating system will execute the application at a lower priority, 61. The system will thence return, awaiting an indication that the user has again moved a pointer to either select or deselect a window, 51.

Figure 4:
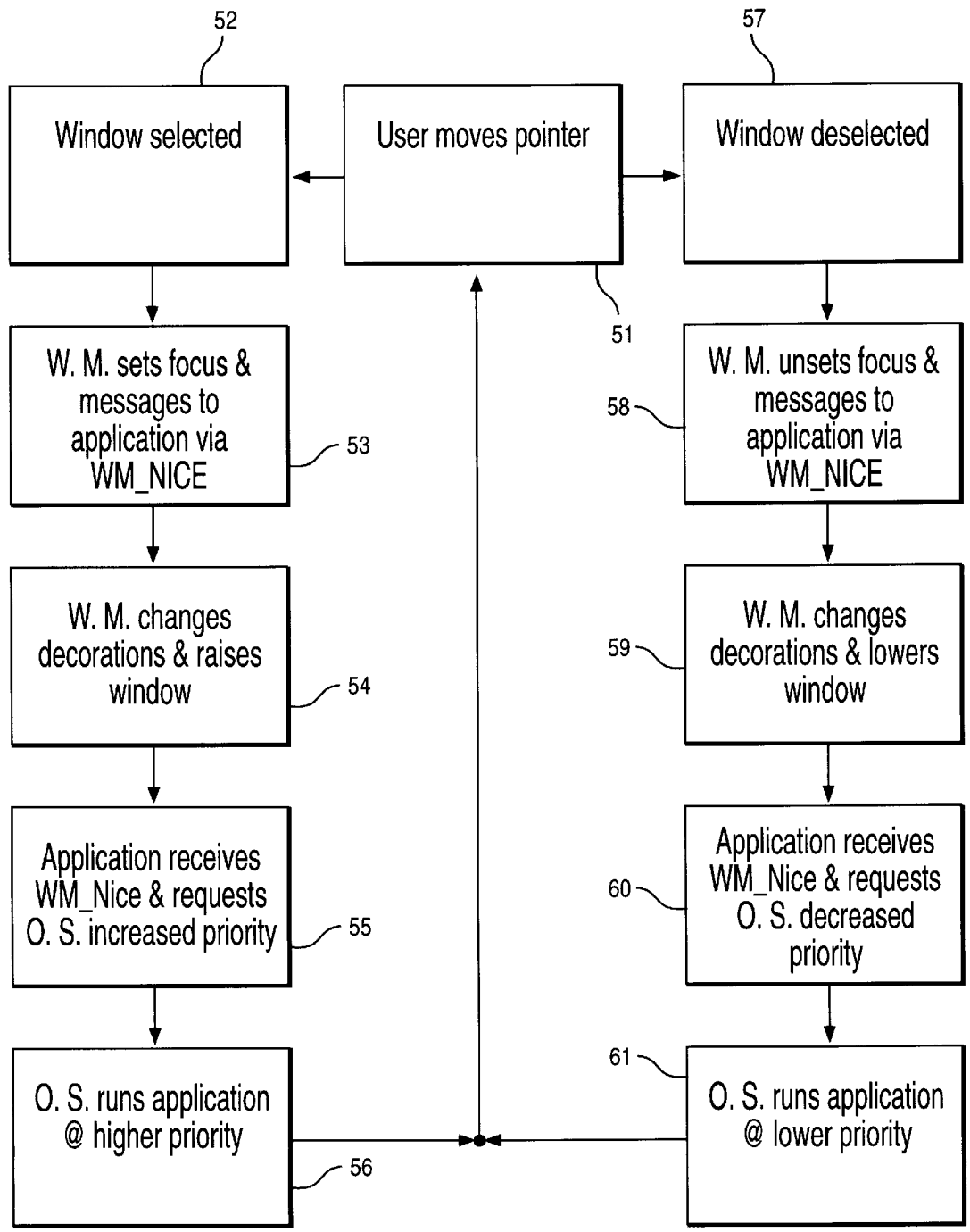
FIG. 4 is a flow diagram implementable in software executing on the system of FIG. 3 illustrating the steps of the method of the invention.

It will be noted in passing that the steps of FIG. 4 may be implemented in software executing on the system of FIG. 3 to effect the invention. Thus, the system in combination with the software steps represented in FIG. 4 will cause the appearance of a window associated with the task 1 to be changed and brought to the foreground, thereby signifying that the task 1 is focused. The system will then set the focus of task 1. This, in turn, will cause the system to increase CPU utilization of task 1 relative to that of task 2, 46. Next, the system will alter the windowed appearance of the task 2 and move it to the background. Next, the system will clear focus of the previously selected task 2 and its corresponding window. CPU utilization for task 2 will then be decreased to that of task 1 prior to its selection.

In accordance with the invention, it will be recalled that an application process through its corresponding window-id may detect from the display server an adjustment in priority that is desired from the window manager which is associated with the task being focused or defocused.

In response to this user input, detected by the X Server 28, the X Server will communicate this input to the Window Manager 22, thereby indicating that window 35 has gained focus. In response, the X window manager 22 will then "set" focus for the particular application or task associated with the window 35 in the server 28's memory 32, employing the SET FOCUS=WM_NICE window manager protocol message. In turn, the corresponding X application 24 in response to interclient communication 25 will, as shown by arrow 21, cause the operating system to up its priority relative to the particular application which was just then focused by user input. At essentially the same time that the window 35 gains focus, the remaining windows such as window 30 will lose focus and CPU priority. Accordingly, the window manager 22, again in accordance with the window manager protocol, will inform the X server 28 with the CLEAR FOCUS= WM_NICE command that it is necessary to clear the focus of the remaining windows such as window 30. In response to this, another call to the operating system will be made by the application or task associated with this recently de-focused window 30 so as to cause de-focusing of window 30's task, e.g., CPU 10 priority allocated to processing the tasks associated with this de-emphasized window 30 is caused to be decreased.

Thus it may be seen in this implementation that activity associated with a window designated or "focused" by the end user is increased in terms of CPU access or priority while, essentially simultaneously, applications or tasks associated with another window are decreased in priority as they go out of focus. Although in the implementation under discussion all applications thereby unfocused will thereafter operate at the same lowered CPU priority as other unfocused applications, the invention is not intended to be so limited, and admits to non-uniform priorities of the unfocused remaining applications.

It should be noted that the window manager 22 of the present invention serves an extremely important role. Normally, with respect to a windowed application, a window manager communicates with it at the X layer, and accordingly does not know anything about it regarding the operating system, e.g., Unix process identification handles or user priorities and thus is incapable of altering them. Externalized ways of enabling obtaining a handle on an application for purposes of changing process priority may exist but ultimately would have to go through the window manager, and thus would be CPU intensive, since they would be monitoring application status at all times. In accordance with an implementation of the invention and its associated window manager, however, a low bandwidth mechanism is provided inasmuch as the window manager is always essentially a go-between between the X server and the application.

It should be noted that there are two additional ways to implement GUI application prioritization having some limitations not present in the previously described system. Each however having more limited application, each, nevertheless, would employ the basic concept in their implementations of escalating the task in focus with a higher priority than other tasks currently running. Fundamentally the GUI window manager (for example Motif's "MWM" or CDE's "DTWM" will "RENICE" the GUI application as it comes into and leaves focus.

In a first alternative such approach, the window manager will keep track of the processes of its interclient communication manager (ICCCM) GUI applications which are being managed, lowering the priority of an application when it loses focus and restoring its priority when it comes into focus. Such a solution is effective for statically library linked legacy applications.

Specifically regarding the latter point, when applications are viewed on displays they do not necessarily have to be executing on the same machine, e.g., a first window might be executing on machine A while a second window is executing on machine B in a distributive system. A problem thus arises in regulating and controlling the CPU execution of tasks on multiple machines at the same time.

In an effort to address this deficiency regarding distributive applications, in yet an alternate implementation, newly built (e.g., non-legacy) applications may be linked to an Xt intrinsics library capable of reprioritizing themselves as they leave or enter focus. While this approach would solve the aforementioned problem of reprioritizing distributive applications, unfortunately it would not be effective in addressing legacy applications currently in use.

Thus in the invention a GUI window manager 22 is adapted to extend its conventional capabilities of launching, moving, resizing, iconifying, tiling, and destroying a windowed task so as to be employed additionally to effect the prioritizing of focused windows.

More particularly, the modified window manager 22, acting as a go-between between X applications 24 and the X server 28, will set the priority at the server 28 for a given task. Xt Intrinsics will function as the recipient of the Window Manager NICE protocol message. This will serve as the triggering mechanism which, in response to the message from the Window Manager, will cause the Intrinsics in the application to call the process table 20 in order to set the priority for the particular task. Since this is a messaging mechanism for the application to essentially reprioritize itself, then there is no need for the cumbersome upkeep of process information to be held by the window manager.

It is conventional for most Unix-based operating system vendors to provide, in addressing legacy applications, for shared libraries. The invention may be easily implemented when introduced in new shared libraries inasmuch as the new functionality, in accordance with the invention, would be inherited by means of the shared libraries for parent and such legacy applications. A feature of the invention is to provide for the improvement of GUI application prioritization while minimizing the changes which may be necessary in a given system. Thus, also in accordance with the invention, in essence all that need be done to effect the benefits thereof is to make changes and distribute them on the system in the pre-existing Window Manager and Xt Intrinsics library. More particularly, the set focus and clear focus functions of the Window Manager may be altered, and similarly the WM_NICE protocol message altered with respect to the Intrinsics library so as to cause triggering of priority settings in the Unix-based operating system. It may thus be readily appreciated that no changes are necessitated to enjoy the benefits of the invention in either the X Server 28 software, the display 26 technology, GUI application, or the process table 20, but rather only in the Window Manager 22 and Intrinsics code 24.

The foregoing describes WM_NICE Window Manager Protocol signalling/messaging. What follows is a description of the WM_Process atom introduced to the X Server for window-id to/from process-id mapping for purposes to be hereinafter described.

The foregoing implementations may give rise to a practical problem which may generally be described as follows. In the X Window System environment, it is possible to control an X window application by iconifying and deconifying it, circulating it up and down, moving it to different workspaces, or closing it. However, in the Unix operating system it is possible to control an application process by stopping and continuing it, reprioritizing it, or terminating it.

A potential difficulty arises however when an application has either a window-id or a process-id of an X application, but is in need of obtaining information and controlling it via the other environment. For example, an application may have a process-id of an X application but would like to effect the moving of it to a different workspace. However, the application is missing a window-id handle which is necessary to do so.

Conversely, and more germane to the particular problem being addressed by the subject invention, an application may have a window-id available and it may be desirable to reprioritize the X application as hereinbefore discussed. However, this may not be possible unless the process-id correlative to the window-id is known as well. Accordingly, in a preferred embodiment of the invention, a need may arise to signal/message back and forth between a window-id and a process-id of an application. In the event a window manager is not employed or available, an external process could be employed to keep an associative table of window ids and processes. However, as previously noted, performance penalties may be exacted for having to effect this mapping at all times to keep the table current. Thus, a preferred implementation includes a Window Manager wherein a window-id-to-process-id signal/message protocol is further included.

Normally, a Window Manager does not need to know an application's process id. Rather it may simply instruct the application to change, not needing to know the machine the application is executing upon, its process-id or the like. The necessary messages to effect change will simply be handed off through the interclient communication to cause the application to RE_NICE itself,for example. In the preceding discussion the Window Manager will store information in the server to be passed off to the application, employing WM_NICE window manager protocol signalling/ messaging. However, in accordance with the present discussion, employing the X server and properties, it is the application which will provide information to the server, and, more particularly, the application will store its process-id in the server so that it may be accessed and utilized by other applications. The WM_Process atom is introduced to the X Server for window-id to/from process-id mapping.

A first scenario is hereinafter described for mapping window-ids to process-ids in order to enable an application knowing a window-id to reprioritize the X application by making the process-id available. As is known in the art, X applications may store properties with aggregate data-types associated with their various windows (30–35, FIG. 1) on the X server 28. Moreover, these properties on the server may be retrieved by name for any given window.

Still further, Window Manager 22 properties typically are stored on a vendor shell window of each Xt Intrinsics-based application. Accordingly, in order to solve the window-id-process-id mapping as needed, it will be advantageous in such instances to store the process-id for example, in the WM_PROCESS_ID property in the aforementioned shell window of each X application. Having thereby stored the process-id in the shell window of each application, this then enables one to retrieve either the window-id or process-id given the alternate value. As applied to the present invention, this then means that given a particular window-id associated with a window which is desired to be prioritized, the foregoing function may be utilized to map back to the corresponding process-id utilized by the X application 24 to appropriately adjust the corresponding process in the process table 20 utilizing the process-id. The foregoing requires changes to Xt Intrinsics.

Yet another mechanism may be provided for effecting the mapping between the window-id and process-id of an application as desired to further effect the GUI task prioritization when this mapping is required. It is conventional for Xt Intrinsic-based applications to store a windows property such as WM_COMMAND for each shell window which contains the command line command which invoked the given application. Conversely, the operating system's process table may be employed to save the command line utilized to invoke the given application. Accordingly, the X window's window-id may be mapped to and from a process-id by comparing command-line commands stored in the X property and process table. The foregoing requires no application, X, Xt, Motif, or Window Manager changes. However, it does require intensive bookkeeping.

Figure 5:
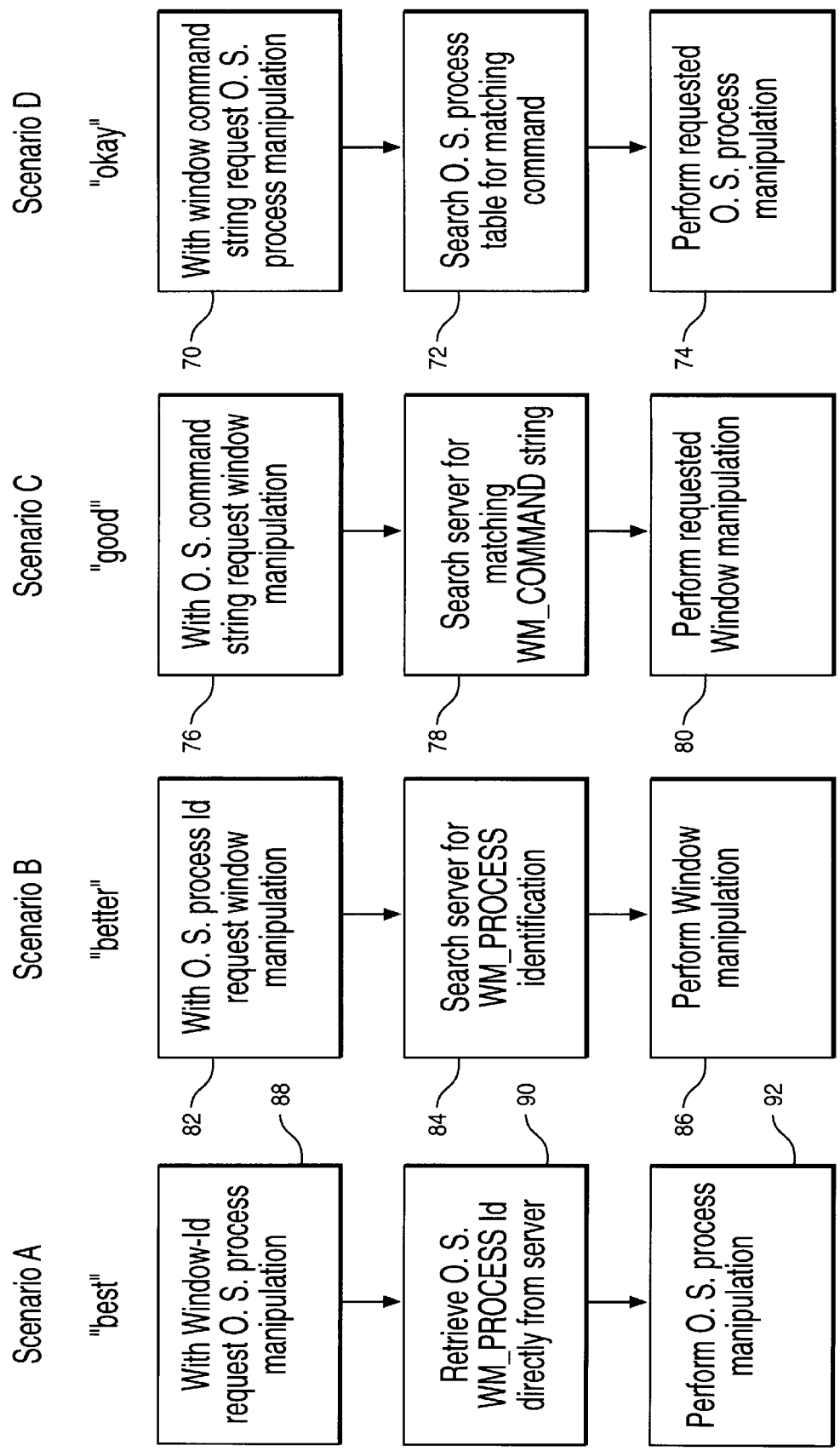
FIG. 5 is a block diagram illustrating different mechanisms for effecting task prioritization.

Referring now to FIG. 5, four alternative implementations of task prioritization are depicted therein in the four columns labelled Scenario A, B, C, and D. Referring first to Scenario D, operating system process manipulation is first requested with a window command string, 70. Next, the operating system process table is searched for a matching command, 72. Finally, the requested operating system process manipulation is performed, 74.

In a next Scenario C, a window manipulation may be requested with an operating system command string, 76. Next, the server is searched for a matching WM_Command string 78. Finally, the requested window manipulation is performed as a result of such string, 80.

In Scenario B, a window manipulation is requested with an operating process-id. The server is then searched for the WM_Process identification, 84. Finally, the window manipulation is performed, 86.

In the final scenario A, the operating system process manipulation is requested with a window-id, 88. Next, the operating system WM_Process-id is retrieved directly from the server. Finally, the operating system process manipulation is performed, 92. It will be noted in step 90 that obtaining the WM_Process-id directly from the server employs a quick mapping scheme.

While the invention has been shown and described with reference to particular embodiments thereof, it will be understood by those skilled in the art that the foregoing and other changes in form and detail may be made therein without departing from the spirit and scope of the invention.

We claim:

1. A method for prioritizing graphical user interface application tasks in a visual display of a computer system having a plurality of CPUs executing a multitasking multi-user distributive operating system running a plurality of processes communicating with interprocess communication (IPC), said computer system including a server and a window manager interconnecting said applications and said server, comprising:

generating a plurality of commands each in response to different corresponding ones of said CPUs interconnected to said distributive operating system;

displaying a plurality of visual indicators each corresponding to a different one of said commands and tasks executing at a corresponding priority;

selecting one of said indicators;

adjusting with said IPC said corresponding priority of one of said tasks relative to remaining ones of said tasks in response to said selecting said one of said indicators, comprising:

saving identities of said processes with said server from said window manager; and sending focus and clear focus (WM_NICE) window manager protocol commands to said server to set priorities for said processes.

2. The method of claim 1 wherein said visual indicators are windows in said visual display.

3. The method of claim 2 wherein one of said windows corresponding to said one of said tasks becomes focused relative to said remaining ones of said tasks in response to said selecting.

4. The method of claim 3 wherein said selected one of said indicators is brought to the foreground of said visual display in response to said selecting.

5. The method of claim 4 wherein said adjusting corresponding priority of one of said tasks relative to remaining ones of said tasks comprises:

increasing utilization by said one of said tasks of at least one of said CPUs to a first level; and reducing utilization by one of said remaining ones of said tasks of said at least one of said CPUs from said first level to a second level.

6. The method of claim 5 wherein prior to said selecting, all of said tasks other than said one of said remaining ones of said tasks are utilizing said at least one of said CPUs at said second level.

7. The method of claim 6 wherein said graphical user interface applications, in response to information in said server from said sending said set focus and said clear focus (W_NICE) commands, sets respective ones of said priorities.

8. The method of claim 7 wherein said operating system includes a process table, and wherein said priorities are set by said applications adjusting said process table in response to said information from said server.

9. The method of claim 8 wherein said priorities are set with Xt Intrinsics (RE_NICE).

10. An apparatus for prioritizing graphical user interface applications tasks in a visual display of a computer system having a plurality of CPUs executing a multitasking multi-user operation system running a plurality of processes communicating with interprocess communication (IPC), said operating system including a server and a window manager interconnecting said applications and said server, comprising:

means for generating a plurality of commands each in response to different corresponding ones of said CPUs interconnected to said distributive operating system;

means for displaying a plurality of visual indicators each corresponding to a different one of said commands and tasks executing at a corresponding priority;

means for selecting one of said indicators;

means for adjusting with said IPC said corresponding priority of one of said tasks relative to remaining ones of said tasks in response to said selecting said one of said indicators comprising:

means for saving identities of said processes in said server from said window manager; and means for sending set focus and clear focus (WM_NICE) commands to said X server to set priorities for said processes.

11. The apparatus of claim 10 wherein said visual indicators are windows in said visual display.

12. The apparatus of claim 11 wherein one of said windows corresponding to said one of said tasks becomes focused relative to said remaining ones of said tasks in response to said means for selecting.

13. The apparatus of claim 12 wherein said selected one of said indicators is brought to the foreground of said visual display in response to said means for selecting.

14. The apparatus of claim 13 wherein said means for adjusting corresponding priority of one of said tasks relative to remaining ones of said tasks comprises:

means for increasing utilization by said one of said tasks of at least one of said CPUs to a first level; and means for reducing utilization by one of said remaining ones of said tasks of said at least one of said CPUs from said first level to a second level.

15. The apparatus of claim 14 wherein prior to said means for selecting, all of said tasks other than said one of said remaining one of said tasks are utilizing said at least one of said CPUs at said second level.

16. The apparatus of claim 15 including means in said graphical user interface applications, in response to information in said server from said means for sending said set focus and said clear focus commands, sets of respective ones of said priorities.

17. The apparatus of claim 16 wherein said operating system includes a process table, and wherein said system includes means for setting said priorities by said applications adjusting said process table in response to said information from said server.

18. The apparatus of claim 17 wherein said priorities are set with Xt intrinsics (RE_NICE).

* * * * *